United States Patent [19]

Ikeguchi

[11] 4,403,073

[45] Sep. 6, 1983

[54] CURABLE RESIN COMPOSITION

[75] Inventor: Nobuyuki Ikeguchi, Tokyo, Japan

[73] Assignee: Mitsubishi Gas Chemical Company, Inc., Tokyo, Japan

[21] Appl. No.: 260,982

[22] Filed: May 6, 1981

[30] Foreign Application Priority Data

| May 6, 1980 [JP] | Japan | 55-59631 |
| Jun. 9, 1980 [JP] | Japan | 55-77384 |
| Feb. 28, 1981 [JP] | Japan | 56-28973 |
| Mar. 19, 1981 [JP] | Japan | 56-39832 |

[51] Int. Cl.$^3$ .............................................. C08F 8/30
[52] U.S. Cl. .................................. 525/374; 525/167; 525/333.2
[58] Field of Search ............... 525/167, 326, 330, 374, 525/333.2

[56] References Cited

U.S. PATENT DOCUMENTS

| 3,448,079 | 6/1969 | Grigat et al. | 260/59 |
| 3,553,244 | 1/1971 | Grigat et al. | 260/453 |
| 3,562,214 | 2/1971 | Leverkusen et al. | 260/47 |
| 3,562,214 | 2/1971 | Kubens et al. | 260/47 |
| 3,740,348 | 6/1973 | Grigat et al. | 260/453 AL |
| 3,755,402 | 8/1973 | Grigat et al. | 260/453 AR |
| 4,110,364 | 8/1978 | Gaku et al. | 528/170 |

FOREIGN PATENT DOCUMENTS 51-63149 of 1976 Japan.
1060933 of 0000 United Kingdom.
1305967 2/1973 United Kingdom.

*Primary Examiner*—Joseph L. Schofer
*Assistant Examiner*—Bernard Lipman
*Attorney, Agent, or Firm*—Fleit, Jacobson & Cohn

[57] ABSTRACT

A curable resin composition comprising a mixture and/or a preliminary reaction product of (a) at least one cyanate compound selected from the group consisting of polyfunctional cyanate esters, prepolymers of said cyanate esters, coprepolymers of said cyanate ester and an amine and mixtures thereof, (b) at least one polymeric material selected from the group consisting of polybutadiene having molecular weight of 500-1,000,000, reaction products of the polybutadiene and a compound selected from the group consisting of isocyanate compounds, acrylates, methacrylates and unsaturated acid anhydrides and the polybutadiene modified by introducing methacryloyl group, acryloyl group or acid anhydride moiety thereinto and optionally (c) at least one compound selected from the group consisting of polyfunctional maleimides, prepolymers of the maleimides or coprepolymers of the maleimides and an amine is disclosed.

13 Claims, 1 Drawing Figure

CURABLE RESIN COMPOSITION

BACKGROUND OF THE INVENTION

This invention relates to a curable resin composition from which a cured resin having resistance to chemicals, heat and moisture, flexural property and good mechanical properties can be prepared.

In the prior art, cured compositions having resistance, to heat, chemicals and moisture and mechanical strength can be prepared from a polyfunctional cyanate ester alone or a mixture of a polyfunctional cyanate ester and a polyfunctional maleimide and, optionally epoxy resin. However, such cured resin does not sufficiently have flexural strength and elasticity.

Monomer units of polybutadienes include cis-1,4 unit trans-1,4 unit and 1,2 unit.

A variety of polybutadiene are made by combining these units, depending on molecular weight of the polymer, the polymerization catalyst and the polymerization process used. However, polybutadiene alone has poor heat resistance.

SUMMARY OF THE INVENTION

The present inventor carried out research for obtaining a cured resin having heat resistance, flexural property and elasticity. As a result, it was found that when a composition comprising a cyanate ester and polybutadiene which is liquid at room temperature and rubbery is cured, flexural property and elasticity of the resulting cured resin can be improved considerably without lowering of heat resistance. Particularly, it was found that when a composition comprising a cyanate ester and a polybutadiene modified by introducing an acryloyl group, methacryloyl group or an acid anhydride moiety into the polybutadiene is cured, the heat resistance of the resulting cured resin is not significantly impaired.

This invention relates to a curable resin composition comprising a mixture and/or a preliminary reaction product of (a) a polyfunctional cyanate ester, prepolymer of the cyanate ester or coprepolymer of the cyanate ester and an amine (sometimes hereinunder referred to as component (a)) and (b) a polymeric material selected from the group consisting of polybutadiene having molecular weight of 500–1,000,000, reaction products of the polybutadiene and a compound selected from the group consisting of iso-cyanate compounds, acrylates, methacrylates and unsaturated acid anhydrides, and the polybutadiene modified by introducing a methacryloyl group, an acryloyl group or an acid anhydride moiety thereinto (sometimes hereinunder referred to as component (b)) and optionally a polyfunctional maleimide, prepolymer of the maleimide or coprepolymer of the maleimide and an amine (sometimes hereinunder referred to as component (c)).

DETAILED DESCRIPTION OF THE INVENTION

Figure 1:
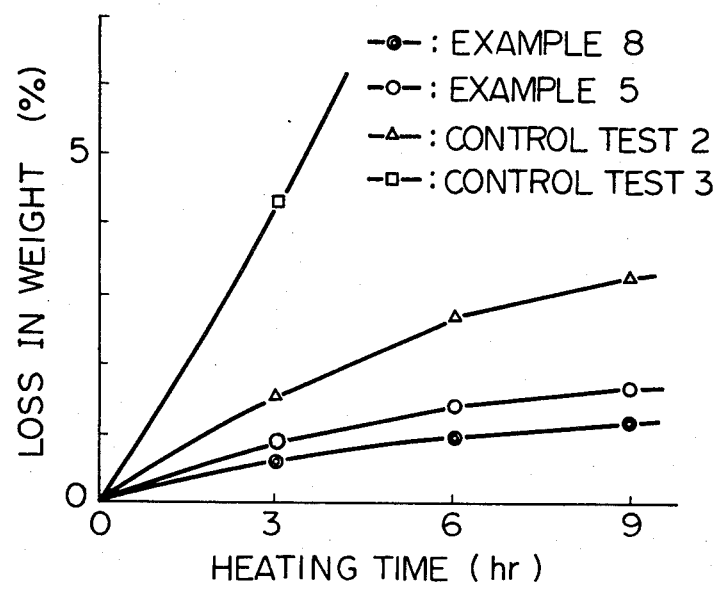
FIG. 1 is a graph that shows the profile of weight loss due to heating of the test pieces of Examples 5 and 8 and Control tests 2–3 when they were heated in an oven at 300° C. for a given period.

By polyfunctional cyanate ester is meant a compound having at least two cyanate groups in its molecule. The polyfunctional cyanate ester is represented by the formula

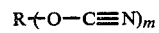

wherein R is an aromatic nucleus-containing residue which is selected from the group consisting of a residue derived from an aromatic hydrocarbon selected from the group consisting of benzene, biphenyl and naphthalene, a residue derived from a compound in which at last two benzene rings are bonded to each other by a bridging member selected from the group consisting of

wherein $R^1$ and $R^2$ are the same or different and each represents a hydrogen atom or an alkyl group containing 1 to 4 carbon atoms,

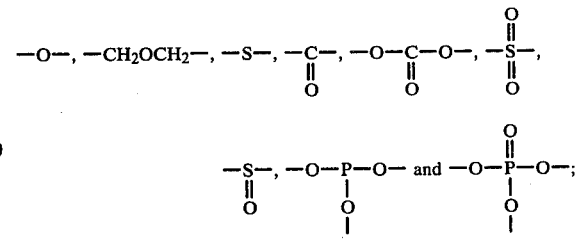

said aromatic nucleus is optionally substituted by a substituent selected from the group consisting of alkyl groups containing 1 to 4 carbon atoms, alkoxy groups, containing 1 to 4 carbon atoms, chlorine and bromine; m is an integer of 2 to 5, and the cyanate group is always directly bonded to the aromatic nucleus.

Examples of the polyfunctional cyanate ester include dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)propane, 2,2-bis(3,5-diblomo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak derived from novalak cyanated bisphenol type polycarbonate oligomer derived from bisphenol type polycarbonate oligomer and mixture thereof. Other cyanate esters employed in the practice of this invention are given in Japanese Patent Publication Nos. 1928/1966, 4791/1969, 11712/1970 and 4112/1979 and Japanese Patent Publication (laid open) No. 63149/1976 which are incorporated herein for references. The above mentioned cyanate esters may be used as mixtures.

Prepolymers may be used containing a sym-triazine ring which is prepared by the trimerization of the cyanate groups of the cyanate ester, and which have an average molecular weight of at least 400 but no more than 6,000. Such prepolymers can be prepared by polymerizing the above cyanate esters in the presence of, as a catalyst, an acid such as a mineral acid or Lewis acid, a base such as sodium hydroxide, a sodium alcoholate or a tertiary amine, or a salt such as sodium carbonate or lithium chloride.

The polyfunctional cyanate ester can be used in the form of a mixture of the monomer and the prepolymer. For example, many of the commercially available cyanate esters derived from bisphenol A and cyanogen halide are in the form of mixtures of cyanate monomers and prepolymers, and such materials can also be used in the present invention.

A coprepolymer of the cyanate ester and an amine may be used as the cyanate ester component. Examples of the amines include meta- or para-phenylenediamine, meta- or para-xylylenediamine, 1,4- or 1,3-cyclohexanediamine, hexahydroxylylenediamine, 4,4'-diaminobiphenyl, bis(4-aminophenyl)-methane, bis(4-aminophenyl)ether, bis(4-aminophenyl)sulfone, bis(4-amino-3-methylphenyl)methane, bis(3-chloro-4-aminophenyl)-methane, bis(4-amino-3,5-dimethylphenyl)methane, bis(4-aminophenyl)cyclohexane, 2,2-(4-aminophenyl)propane, 2,2-bis(4-amino-3-methylphenyl)propane, 2,2-bis(3,5-dibromo-4-aminophenyl)-propane, bis(4-aminophenyl)phenylmethane, 3,4-diaminophenyl-4'-aminophenylmethane and 1,1-bis(4-aminophenyl)-1-phenylethane.

A mixture of prepolymer of the cyanate ester and coprepolymer of the cyanate ester and an amine may be used.

The polybutadiene having molecular weight of 500–1,000,000 employed in the practice of this invention has a Mooney Viscosity of 0(liquid at room temperature)—200(elastic). In general, the polybutadiene may contain cis-1,4 unit, trans-1,4 unit and/or 1,2 unit.

Reaction products of the polybutadiene and an isocyanate, an acrylate, a methacrylate or an unsaturated acid anhydride may also be employed as component (b) of this invention. Preferably the reaction product may be prepared by reacting polybutadiene which is liquid at room temperature and which has molecular weight of 500–10,000, more preferably molecular weight of 700–5,000 with an isocyanate, an acrylate, a methacrylate or a saturated acid anhydride in the present or absent of a solvent. The reaction is known.

By isocyanate is meant a compound having at least two isocyanate groups. By acrylate or methacrylate is meant a compound having one or more acryloyl or methacryloyl group in its molecule. By unsaturated acid anhydride is meant a compound having olefinically C—C double bond and acid anhydride moiety.

Polybutadiene modified by introducing an acryloyl group, a methacryloyl group or an acid anhydride moiety thereinto may be employed as component (b) of this invention.

The non-modified polybutadiene and the modified polybutadiene are preferable as component (b) of this invention.

The modified polybutadiene may be prepared by reacting polybutadiene having hydroxy group, carboxy group, epoxy group or isocyanate group at its end and/or side position with a compound represented by the formula

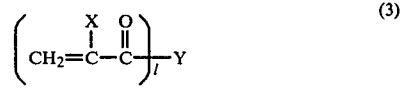

(3)

wherein X is methyl or hydrogen; Y is selected from halogen, hydroxy group, or an organic group having a functional group selected from the group consisting of carboxy, hydroxy, epoxy, amino, isocyanate in which the organic group bonds to the acryloyl or methacryloyl group through ether bond, ester bond, urea bond or amide bond, and l is 1,2 or 3. For example, the modified polybutadiene may be prepared by the following reaction:

(a) reacting a hydroxy, carboxy or epoxy-terminated compound represented by formula (3) with polybutadiene having hydroxy, carboxy or epoxy group at its end and/or side position;

(b) reacting hydroxy-containing polybutadiene with (meth)acrylic halide or (meth)acrylic epoxy ester, such as glycidyl (meth)acrylate in stoichiometric amount (when (meth)acrylic halide is used, the reaction is effected in the presence of an agent linking with an acid, such as a tertiary amine including pyridine);

(c) reacting a carboxy-containing polybutadiene with a hydroxy or epoxy-containing acrylate or methacrylate;

(d) reacting an epoxy-containing polybutadiene with a hydroxy-containing acrylate or methacrylate; and (e) reacting an isocyanate-containing polybutadiene with a hydroxy-containing acrylate or methacrylate.

The hydroxy, carboxy, epoxy or isocyanate-containing polybutadiene employed in the above reactions can be prepared by introducing into butadiene these groups, or by reacting butadiene with a compound having one of these groups.

Polyisocyanates employed for preparing the isocyanate-containing polybutadiene or an isocyanate-containing acryloyl or methacryloyl compound include, for example tolylene diisocyanate, xylylene diisocyanate, and hexamethylene diisocyanate.

Polyhydric alcohols employed for preparing the hydroxy-containing acrylate or methacrylate include, for example aliphatic, alicyclic or aromatic alcohols having valency of 2–4 and carbon atoms of 2–15, such as ethylene glycol, propylene glycol, 1,4-butanediol, 1,6-hexanediol, glycerin, trimethylol propane, pentaerythritol, neopentyl glycol and xylylene glycol; and ether type polyhydric alcohols having carbon atoms of 4–20, such as diethylene glycol, triethylene glycol, tetraethylene glycol, polyethylene glycol and polypropylene glycol, and mixtures thereof. Besides the above polyhydric alcohols, addition products of an alkylene oxide, such as ethylene oxide and active hydrogen containing compound, such as diethanol amine, the above polyhydric alcohol or an amine may be used.

Polyepoxy compounds employed for preparing the epoxy-containing acrylate or methacrylate include, for example epoxy compounds having valency of 2–6 and carbon atoms of 1–20, such as glycerine glycidylether, ether of diglycidyl phthalate and bisphenol A type diglycidyl ether.

The compounds represented formula (3) include for example acrylates, methacrylates, amide-containing acrylates and amide-containing methacrylates are preferable; and acrylates and methacrylates are more preferable.

Introduction of an unsaturated acid anhydride moiety is effected by reacting polybutadiene with an olefinically C—C double bond of an unsaturated acid anhydride. The unsaturated acid anhydrides include, for example compounds represented by the formulas

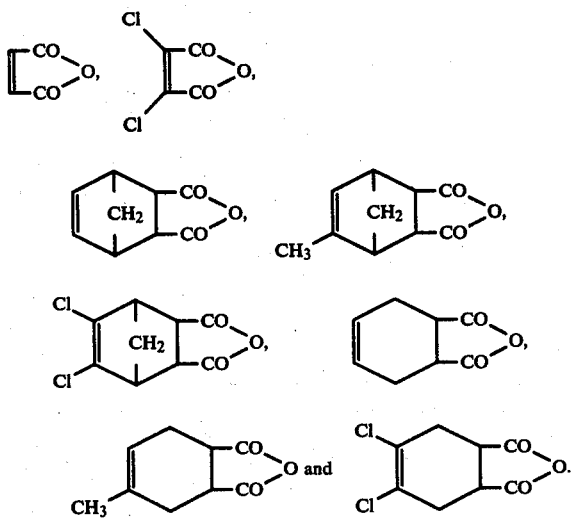

It is believed that the reaction is effected by adding the olefinically C—C double bond of the unsaturated acid anhydride to tertiary carbon in the polybutadiene. Therefore, it is preferable that the butadiene moiety of the polybutadiene have a 1,2- double bond in order to effect the reaction. It is thought that the reaction is effected by the following equation:

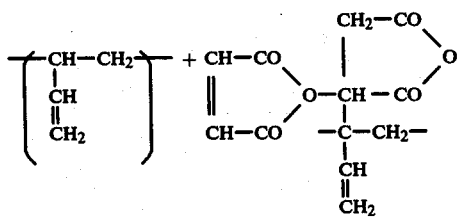

The preferable component (b) includes, for example polybutadiene modified by introducing acryloyl, methacryloyl or acid anhydride moiety thereinto.

The polyfunctional maleimides employed in the present invention are organic compounds having two or more maleimide groups derived from maleic anhydride and a polyamine and are represented by the following general formula

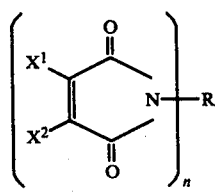

wherein R represents divalent to pentavalent aromatic or alicyclic organic group, each of $X^1$ and $X^2$ represents a hydrogen atom, halogen atom or alkyl group, and n represents an integer of 2-5.

The maleimides represented by the above formula can be produced by a method khown per se which involves reacting maleic anhydride with polyamine to form a maleamide acid, and then dehydro-cyclizing the maleamide acid. Examples of polyfunctional maleimide include consisting of 1,3- or 1,4-dimaleimide benzene, 1,3- or 1,4-bis(maleimido methylene)benzene, 1,3- or 1,4-dimaleimido cyclohexane, 1,3- or 1,4-bis(maleimidomethylene)cyclohexane 4,4'-dimaleimido biphenyl, bis(4-maleimidophenyl)methane, bis(4-maleimidophenyl)ether, bis(4-maleimidophenyl)sulfone, bis(4-maleimido-3-methylphenyl)methane, bis(4-maleimido-3-chlorophenyl)methane, bis(4-maleimido-3,5-dimethylphenyl)methane, 2,2-bis(4-maleimido-3-methylphenyl)-propane, 2,2-bis(4-maleimido-3,5-dibromophenyl)propane, bis(4-maleimidophenyl)phenylmethane, 3,4-dimaleimidophenyl-4'-maleimidophenylmethane, 1,1-bis(4-maleimidophenyl)-1-phenylmethane, and maleimides derived from melamine and addition product of formalin and an aniline in which benzene rings of two or more aniline bond through methylene group.

Aromatic amines are preferable as the starting polyamines. The reason is that the resulting object resin has excellent properties, such as heat-resistance, etc. When the resulting object resins have desirable flexibility and pliability, alicyclic amine alone or combination of the alicyclic amines and other amines may be used. Though secondary amines can be used as the starting amine, the primary amines are preferable.

Amines employed in reaction with cyanate esters for preparing coprepolymers of the cyanate ester and the amine may be profitably used as an amine component for preparing maleimides. In addition to the above-mentioned amines, melamine having s-triazine ring and polyamines obtained by reaction aniline with formaldehyde, in which two or more benzene rings are bonded through methylene bond, may also be used.

The functional maleimides as mentioned above may be used alone or as a mixture. Also the prepolymer of the maleimide obtained by heating the maleimide in the presence or absence of a catalyst may be used. In addition, coprepolymers of the maleimide and the amine employed for synthesizing the polyfunctional maleimide may be used.

The ratio of component (a) and component (c) is not critical. In general, the ratio by weight of component (a) and component (c) may be in the range of from 99:1 to 40:60.

The ratio of component (a) and component (b) is not critical. When preparing heat resistant resin having good adhering property, 1–50% by weight of component (b) and preferably 5–40% by weight of component (b) may be used on the basis of total weight of components (a) and (b) or on the basis of total weight of components (a), (b) and (c) (when component (c) is used). In order to improve heat resistance of cured resin derived from component (b), it is preferable to use 5–50% by weight of component (a) or components (a) and (c) on the basis of total weight of components (a) and (b) or components (a), (b) and (c).

The curable composition of this invention comprises a mixture and/or a preliminary reaction product of component (a) and component (b), and optionally component (c) and optionally other functional group-containing compounds (sometimes hereinunder referred to as component (d)). Component (d) includes, for example (methacrylic esters or prepolymers thereof, such as esters of monofunctional or polyfunctional hydroxy compounds and (meth)acrylic acid, epoxy ester of (meth)acrylic acid, and alkenyl ester of (meth)acrylic acid; polyallyl compounds or prepolymers thereof, such as diallyl phthalate, divinylbenzene, diallylbenzene, and trialkenyl isocyanurate, dicyclopentadiene or prepolymer thereof; epoxy resin; polyimide resin and acid anhydrides such as maleic anhydride and tetrahydrophthalic anhydride. The resin component may be a mixture of components (a) and (b) and optionally (c) and/or (d); a preliminary reaction product of components (a) and (b), components (a), (b) and (c) or components (a), (b), (c) and (d); a mixture of preliminary reaction product of two or three of components (a), (b), (c) and (d) and the remainder thereof.

The curable composition of this invention may be reticulated by heating it alone to form a cured resin having heat resistance. In general, a catalyst may be used in order to promote crosslinking reaction of the components in the composition.

Examples of the catalysts include imidazoles, such as 2-methylimidazole, 2-undecylimidazole, 2-heptadecylimidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition product of an imidazole and trimellitic acid; tertiary amines, such as N,N-dimethyl benzylamine, N,N-dimethylaniline, N,N-dimethyltoluidine, N,N-dimethyl-p-anisidine, p-halogeno-N,N-dimethyl-aniline, 2-N-ethylanilino ethanol, tri-n-butylamine, pyridine, quinoline, N-methylvorpholine, triethanolamine, triethylenediamine, N,N,N',N'-tetramethylbutanediamine, N-methylpiperidine; phenols, such as phenol, cresol, xylenol, resorcine, and phloroglucin; organic metal salts, such as lead naphthenate, lead stearate, zinc naphthenate, zinc octylate, tin oleate, dibutyl tin maleate, manganese naphthenate, cobalt naphthenate, and acetyl acetone iron; and inorganic metal salts, such as stannic chloride, zinc chloride and aluminum chloride; peroxides, such as benzoyl peroxide, lauroyl peroxide, octanoyl peroxide, acetyl peroxide, para-chlorobenzoyl peroxide and di-t-butyl diperphthalate; acid anhydrides, such as maleic anhydride, phthalic anhydride, lauric anhydride, pyromellitic anhydride, trimellitic anhydride, hexahydrophthalic anhydride, lexahydropyromellitic anhydride and hexahydrotrimellitic anhydride; azo compounds, such as azoisobutylonitrile, 2,2'-azobispropane, m,m'-azoxystyrene, hydrozones, and mixtures thereof.

In addition to the above-mentioned catalyst, a curing agent for epoxy resin and a curing catalyst for epoxy resin may be used as a catalyst of this invention.

The amount of the catalyst employed may be less than 5% by weight of the total composition.

A variety of additives may be added to the curable composition to impart specific properties provided that they do not impair the essential properties of the resulting resin. Examples of the additives include natural or synthetic resins, fibrous reinforcement, fillers, pigments, dyestuffs, thickening agents, lubricants, flame-retardants and the like.

The curable compositions of this invention are present in a wide range of forms from liquid to solid at room temperature, depending on the nature of the components constituting the composition, and the preliminary reaction conditions. Solid curable composition, liquid curable composition or solution of the composition in solvent may be used according to the use purpose.

The curing conditions of the curable composition of this invention depend on the proportion of components constituting the composition and the nature of the components employed. In general, the composition of this invention may be cured by heating it at a temperature within the range of 90°–300° C., preferably 100°–270° C.

When the curable composition of this invention is used for preparing molding, laminate, adhesive-assembly, press means is preferably applied to the molding, laminate or adhesive-assembly in the heat curing step. In general, these products may be pressed at a pressure of 0.1–500 Kg/cm$^2$.

The composition of this invention cures rapidly, even under mild conditions, so is especially suitable when quantity production and ease of workability are desired. The cured resin made from the composition not only has excellent adhesive force, bond strength, heat resistance, and electric properties, but also is excellent in mechanical properties and resistance to impact, chemicals, moisture and the like. The composition of this invention has a variety of uses as a coating material for rust prevention, flame resistance, flame retardance and the like; as electrical insulating varnish; as adhesive; in laminates to be used for furnitures, building materials, sheathing materials, electrical insulating materials, and the like; and in a variety of moldings.

The present invention is further illustrated by the following non-limiting Examples and Controls.

Percent and parts are by weight, unless otherwise specified.

EXAMPLE 1

2,2-Bis(4-cyanatophenyl)propane (400 g) was preliminarily polymerized at 150° C. for 150 minutes to form prepolymer. The prepolymer was dissolved in a mixture of cyclohexanone and N,N-dimethylformamide. The resulting solution was mixed intimately with polybutadiene having average molecular weight of 1,600 (160 g), then with zinc octylate (0.06 g), benzoyl peroxide (0.1 g) and triethylenediamine (0.04 g) as a catalyst.

A coating of the resulting blend was applied to two epoxy resin test panels (125 mm long, 25 mm wide, 0.4 mm thick) and dried with heat to B-stage. The two test panels were joined so that the surfaces dried to B-stage contacted each other to provide a 10 mm wide overlap along the longitudinal edge, and the joined panels were heat-cured at 110° C. for 15 hours. The overlapped portion of the panels was 2.0 mm thick and had a shear bond strength of 82 Kg/cm$^2$.

EXAMPLE 2

2,2-Bis(4-cyanatophenyl)propane (1000 g) was preliminarily polymerized at 140° C. for 410 minutes. The resulting prepolymer was dissolved in methyl ethyl ketone. Polybutadiene resin (Nipol BR 1200, produced by Nippon Zeon Co., Ltd.) (200 g) was dissolved in a mixture of methyl ethyl ketone and N,N-dimethylformamide. To the prepolymer solution, the polybutadiene resin solution, glycidyl methacrylate (200 g) and zinc octylate (0.4 g), triethylenediamine (0.3 g) and benzoyl peroxide (0.1 g) as a catalyst were added, and the ingredients were mixed uniformly. A glass cloth was impregnated with the mixture and dried with heat to form a B-stage prepreg. A single layer of the prepreg was sandwiched between two electrolytic copper foils lack 35μ thick and pressed at 40 Kg/cm$^2$ at 170° C. for 100 minutes to produce a copper-clad laminated sheet. The properties of the sheet are shown in Table 1.

EXAMPLE 3

1,4-Dicyanatobenzene (900 g) and bis(4-maleimidophenyl)-methane (100 g) were preliminarily reacted at 150° C. for 120 minutes. The reaction product was dissolved in a mixture of methyl ethyl ketone and N,N-dimethylformamide. Then polybutadiene resin (Nipol BR 1441 produced by Nippon Zeon Co., Ltd.) (350 g) was dissolved in the solution, and then tin octylate (0.3 g), N,N-dimethylbenzylamine (0.9 g), catechol (1.0 g) and azoisobutylonitrile (0.2 g) as a catalyst were added to the solution, and the ingredients were mixed uniformly.

A glass cloth web was impregnated with the resin solution of Example 2 and dried to form semi-cured product and then with the above resin solution and dried to form a B-stage prepreg. The prepreg web was sandwiched between electrolytic copper foils each 35μ thick and continuously pressed between rolls at 10 Kg/cm² at 153° C. and wound up, and then cured in a drier at 165° C. for 90 minutes to obtain good copper clad laminate. Properties of the laminate are shown in Table 1.

Control test 1

The procedure of Example 3 was repeated except that polybutadiene was not used. Properties of the resulting laminate are shown in Table 1.

TABLE 1

|  | Ex. 2 | Ex. 3 | control test 1 |
|---|---|---|---|
| peel strength of copper foil (Kg/cm²) | 1.70 | 1.60 | 1.60 |
| glass transition temperature (°C.) | 219 | 207 | 221 |
| hot solder resistance (260° C., 5 minutes) | no change | no change | no change |
| flexural property (wound 2.0 mmφ) | no change | no change | cracking |

EXAMPLE 4

Polybutadiene (average molecular weight of 1200, number of average hydroxy groups of 2.2) (200 g) and 2,2-bis(4-isocyanatophenyl) propane (500 g) were preliminarily reacted in dimethylformamide at 70° C. for 110 minutes. 2,2-Bis(4-cyanatophenyl)propane (300 g) was preliminarily polymerized at 150° C. for 190 minutes. The resulting prepolymer was added to the solution and then zinc octylate (0.2 g) and triethylenediamine (0.2 g) as a catalyst were added to the mixture.

A coating of the resulting blend was applied to two epoxy resin test panels (125 mm long, 25 mm wide, 0.4 mm thick) and dried with heat to B-stage. The two test panels were joined so that the surfaces dried to B-stage contacted each other to provide a 10 mm wide overlap along the longitudinal edge, and the joined panels were heated-cured at 110° C. for 20 hours and then at 140° C. for 2 hours. The overlapped portion of the panels was 2.0 mm thick and had a shear bond strength of 72.0 Kg/cm² and glass transition temperature of 242° C.

EXAMPLE 5

2,2-Bis(4-cyanatophenyl)propane (700 parts), and bis(4-maleimidophenyl)methane (300 parts) were preliminarily reacted at 150° C. for 120 minutes. A molten mixture of 850 parts of the reaction product and 150 parts of modified butadiene into which acryl group is introduced (TE 200, produced by Nippon Soda Co., Ltd.) was charged into a mold and heat-cured at 20 Kg/cm² for 120 minutes at 175° C. for an additional 60 minutes at 260° C. to form a casting 2 mm thick. The sheet was cut into pieces (50×50 mm) which were dried at 110° C. for 60 minutes, and cooled by standing in a desiccator, and their weight was measured. They were subsequently heated in an oven at 300° C. for a given period and loss in weight due to heating was measured. The results are graphed in FIG. 1.

Control Tests 2–4

The preliminary reaction product (850 parts) of 2,2-bis(4-cyanatophenyl)propane and bis(4-maleimidophenyl)methane prepared in Example 1 and each of polybutadiene (150 parts) modified by introducing epoxy group into 1,2-polybutadiene with peracetic acid (BF-1000, produced by Nippon Soda Co., Ltd.) (Control 2) and hydantoin type epoxy-modified polybutadiene (150 parts) (CY-350, produced by Chiba Geigy AG) (Control 3) were molded in the same way as in Example 5 to obtain castings. Each of the castings was measured in the same way as in Example 5. The results are shown in FIG. 1.

For comparison, an attempt was made to mold 1,2-polybutadiene along, but a cured product could not be obtained (Control 4).

EXAMPLE 6

850 Parts of the preliminary reaction product of 2,2-bis(4-cyanatophenyl)propane and 150 parts of bis(4-maleimidophenyl)methane prepared in Example 5 and acryl group-terminated polybutadiene (TE 2000, produced by Nippon Soda Co., Ltd.) were mixed uniformly. The mixture was coated on a stainless steel plate 1 mm thick in accordance with JIS K 6850 and cured for 120 minutes at 175° C. and for an additional 60 minutes at 260° C. The resulting plate was allowed to stand at 260° C. in an oven. Deterioration in tensile shear strength of the plate was measured. The results are shown in Table 2.

EXAMPLE 7

2,2-Bis(4-cyanatophenyl)propane (900 parts) and bis(4-maleimidophenyl)ether (100 parts) were preliminarily reacted at 150° C. for 150 minutes. The reaction product, epoxy resin (EPICOTE 1001, produced by Shell Chemical Co., Ltd.) (200 parts) and acryl-terminated polybutadiene (TE-2000, produced by Nippon Soda Co., Ltd.) (300 parts) were dissolved in toluene. To the solution, zinc octylate (0.3 parts), triethylenediamine (0.3 parts) and benzoyl peroxide (0.4 parts) as a catalyst were added and the ingredients were mixed uniformly.

A glass cloth was impregnated with the mixture and dried with heat to form a B-stage prepreg. Eight layers of the prepreg were sandwiched between two electrolytic copper foils each 35μ thick, and pressed at 40 Kg/cm² and 175° C. for 120 minutes, then at 50 Kg/cm² and 200° C. for 120 minutes to produce a copper-clad laminated sheet. The properties of the sheet are set forth in Table 3 below.

TABLE 2

|  |  | Ex. 8 |
|---|---|---|
| tensile shear strength in oven maintained at 260° C. (Kg/cm²) | initial | 138 |
|  | after 50 hours | 90 |
|  | after 100 hours | 75 |

TABLE 3

|  |  | Ex. 7 |
| --- | --- | --- |
| Peel strength of copper foil (Kg/cm$^2$) | 25° C. | 1.85 |
|  | 100° C. | 1.80 |
|  | 150° C. | 1.74 |
| Barcol hardness | 25° C. | 68 |
| flexural strength (Kg/mm$^2$) | 25° C. | 53 |
|  | 100° C. | 49 |
|  | 150° C. | 43 |
| water absorption E-24/ 50 + D-24/23 (%) |  | 0.11 |
| dielectric constant (25° C.) | 1MHz | 3.9 |
| dielectric dissipation factor (25° C.) | 1MHz | 0.0063 |
| chemical resistance (immersion for 5 hours) | 5% NaOH 5% H$_2$SO$_4$ trichlene acetone | no change |

EXAMPLE 8

2,2-Bis(4-cyanatophenyl)propane (700 parts) and bis(4-maleimidophenyl)methane (300 parts) were preliminarily reacted at 150° C. for 120 minutes to obtain the reaction product, 1,2-Polybutadiene (molecular weight about 1000) (1000 parts) and maleic anhydride (150 parts) were reacted at 180° C. until maleic anhydride amounted to less than 0.1% to obtain maleic-modified 1,2-polybutadiene (BN-1015, produced by Nippon Soda Co., Ltd.) in which the unsaturated double bond of maleic anhydride is added to tertiary carbon atom of 1,2-polybutadiene. The reaction product (850 parts) was mixed with the maleic-modified 1,2-polybutadiene and the mixture was molten and charged in a mold, and cured at 20 Kg/cm$^2$ at 175° C. for 120 minutes and for an additional 60 minutes at 260° C. to form a casting 2 mm thick. The casting sheet was cut into pieces (50×50 mm) which were dried at 110° C. for 60 minutes, and cooled by standing in a desiccator, and their weight was measured. They were subsequently heated in an oven at 300° C. for a given period to measure any loss in their weight due to heating. The results are graphed in FIG. 1.

EXAMPLE 9

The reaction product (850 parts) of Example 8 and maleic-anhydride-modified 1,2-polybutadiene (150 parts) of Example 8 were mixed uniformly. The mixture was used for bonding test samples made of stainless steel 1 mm thick. The mixture was attached to the steel plate in compliance with JIS K 6850 and heat-cured at 175° C. for 120 minutes and for additional 60 minutes at 260° C. The resulting tensile test piece was aged in an oven at 260° C. to check any reduction in the tensile shear strength. The results are shown in Table 4 below.

EXAMPLE 10

Bis(4-maleimidophenyl)ether (100 parts) and 2,2-bis(4-cyanatophenyl)propane (900 parts) were preliminarily reacted at 150° C. for 150 minutes. To the mixture, epoxy resin (EPICOTE 1001, produced by Shell Chemical Co., Ltd.) (400 parts) and maleic-modified 1,2-polybutadiene were added. The resulting mixture was dissolved in methyl ethyl ketone. Zinc ocrylate (0.2 parts), and triethylenediamine (0.2 parts) as a catalyst were added to the mixture and the ingredients were mixed uniformly. A glass cloth was impregnated with the mixture and dried with heat to form a B-stage prepreg. Six layers of the prepreg were sandwiched between two electrolytic copper foils each 35μ thick, and pressed at 40 Kg/cm$^2$ and 175° C. for 120 minutes, then at 50 Kg/cm$^2$ and 200° C. for 120 minutes to produce a copper-clad laminated sheet. The properties of the sheet are set forth in Table 5 below.

TABLE 4

|  |  | Ex. 9 |
| --- | --- | --- |
| tensile shear strength in oven maintained at 260° C. (Kg/cm$^2$) | initial | 167 |
|  | after 10 hours | 130 |
|  | after 180 hours | 115 |

TABLE 5

|  |  | Ex. 10 |
| --- | --- | --- |
| peel strength of copper foil (Kg/cm$^2$) | A | 1.90 |
|  | S$_4$ | 1.85 |
| dielectric constant | 1MHz | 4.1 |
| dielectric dissipation factor | 1MHz | 0.0052 |
| chemical resistance (immersion at 25° C. for 25 hours) | 5% NaOH 5% H$_2$SO$_4$ trichlene gasoline (20° C., 120 hr) | no change |

What is claimed is:

1. A curable resin composition comprising:
   (a) at least one cyanate ester compound selected from the group consisting of:
   (1) a polyfunctional aromatic cyanate ester monomer having the formula:

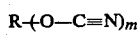

$$R\text{+}O-C\equiv N)_m$$

wherein m is 2 to 5 and R is an aromatic organic group, the cyanate groups being bonded to an aromatic ring of said aromatic organic group,
   (2) a prepolymer of (1), and
   (3) a coprepolymer of (1) and an amine; and
   (b) at least one polymeric material selected from the group consisting of:
   (1) a polybutadiene having a molecular weight of 500 to 1,000,000,
   (2) a reaction product of (1) and a compound selected from the group consisting of an isocyanate compound, an acrylate, a methacrylate and an unsaturated acid anhydride, and
   (3) the product formed by modifying (1) by introducing a methacryloyl group, an acryloyl group or an acid anhydride moiety thereinto,
   said composition including a mixture of components (a) and (b), a preliminary reaction product of components (a) and (b), or the combination of said mixture and said preliminary reaction product.

2. The composition as defined in claim 1 wherein the cyanate ester is selected from the group consisting of 1,3-, 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane; 2,2-bis(3,5-dichloro-4-cyanatophenyl)propane; 2,2-bis(3,5-dibromo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak produced by reacting a novolak with cyanogen halide; cyanated bisphenol polycarbonate oligomer produced by reacting a bisphenol polycarbonate oligomer with cyanogen halide; and mixtures thereof.

3. The composition as defined in claim 1 wherein component (b) is selected from the group consisting of polybutadiene having molecular weight of 500–1,000,000.

4. The composition as defined in claim 1 wherein component (b) is selected from the group consisting of the products formed by modifying (1) polybutadiene by introducing a methacryloyl group, an acryloyl group or an acid anhydride moiety thereinto.

5. The composition as defined in claim 4 wherein component (b) is obtained by reacting the polybutadiene having a hydroxide group, a carboxylic group, an epoxy group or an isocyanate group at its end and/or side position with a compound represented by the formula:

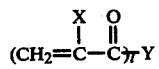

wherein X is methyl or hydrogen; Y is halogen, a hydroxy group, or an organic group having a functional group selected from the group consisting of carboxy, hydroxy, epoxy, amino and isocyanate in which the organic group bonds to the acryloyl or methacryloyl group through an ether bond, ester bond, urea bond or amide bond, and l is 1, 2 or 3.

6. The composition as defined in claim 1 wherein component (b) is used in an amount of 1–95% by weight on the basis of total weight of components (a) and (b).

7. A curable resin composition comprising:
(a) at least one cyanate ester compound selected from the group consisting of:
(1) a polyfunctional aromatic cyanate ester monomer having the formula:

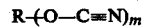

wherein m is 2 to 5 and R is an aromatic organic group, the cyanate groups being bonded to an aromatic ring of said aromatic organic group,
(2) a prepolymer of (1), and
(3) a coprepolymer of (1) and an amine;
(b) at least one polymeric material selected from the group consisting of:
(1) a polybutadiene having a molecular weight of 500 to 1,000,000,
(2) a reaction product of (1) and a compound selected from the group consisting of an isocyanate compound, an acrylate, a methacrylate and an unsaturated acid anhydride, and
(3) the product formed by modifying (1) by introducing a methacryloyl group, an acryloyl group or an acid anhydride moiety thereinto,
(c) at least one compound selected from the group consisting of:
(1) a polyfunctional maleimide,
(2) a prepolymer of (1), and
(3) a coprepolymer of (1) and an amine,
said composition including a mixture of components (a), (b) and (c), a preliminary reaction product of components (a), (b) and (c), the combination of said mixture and said preliminary reaction product, the combination of (a) and the preliminary reaction product of (b) and (c), the combination of (b) and the preliminary reaction product of (a) and (c), or the combination of (c) and the preliminary reaction product of (a) and (b).

8. The composition as defined in claim 7 wherein the cyanate ester is selected from the group consisting of 1,3-, 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane; 2,2-bis(3,5-dichloro-4-cyanatophenyl)propane; 2,2-bis(3,5-dibromo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak produced by reacting a novolak with cyanogen halide; cyanated bisphenol polycarbonate oligomer produced by reacting a bisphenol polycarbonate oligomer with cyanogen halide; and mixtures thereof.

9. The composition as defined in claim 7 wherein component (b) is selected from the group consisting of polybutadiene having molecular weight of 500–1,000,000.

10. The composition as defined in claim 7 wherein component (b) is selected from the group consisting of the products formed by modifying (1) by introducing a methacryloyl group, acryloyl group or an acid anhydride moiety thereinto.

11. The composition as defined in claim 10 wherein component (b) is obtained by reacting the polybutadiene having a hydroxide group, a carboxylic group, an epoxy group or an isocyanate group at its end and/or side position with a compound represented by the formula:

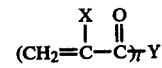

wherein X is methyl or hydrogen; Y is halogen, a hydroxy group, or an organic group having a functional group selected from the group consisting of carboxy, hydroxy, epoxy, amino and isocyanate in which the organic group bonds to the acryloyl or methacryloyl group through an ether bond, ester bond, urea bond or amide bond, and l is 1, 2 or 3.

12. The composition as defined in claim 7 wherein the polyfunctional maleimide is selected from the group consisting of 1,3- or 1,4-dimaleimide benzene, 1,3- or 1,4-bis(maleimide methylene)benzene, 1,3- or 1,4-dimaleimide cyclohexane, 1,3- or 1,4-bis(maleimide methylene)cyclohexane, 4,4'-dimaleimide biphenyl, bis(4-maleimidephenyl)methane, bis(4-maleimidephenyl)ether, bis(4-maleimidephenyl)sulfone, bis(4-maleimide-3-methylphenyl)methane, bis(4-maleimide-3-chlorophenyl)methane, bis(4-maleimide-3,5-dimethylphenyl)methane, 2,2-bis(4-maleimide-3-methylphenyl)propane, 2,2-bis(4-maleimide-3,5-dibromophenyl)propane, bis(4-maleimidephenyl)phenylmethane, 3,4-dimaleimidephenyl-4'-maleimidephenylmethane, 1,1-bis(4-maleimidephenyl)-1-phenylmethane, and maleimide derived from melamine and, addition product of formalin and an aniline in which benzene rings of two or more aniline bond through methylene group.

13. The composition as defined in claim 12 wherein component (b) is used in an amount of 1–95% by weight on the basis of total weight of components (a), (b) and (c).

* * * * *